(12) United States Patent
Hopperstad et al.

(10) Patent No.: US 8,174,927 B2
(45) Date of Patent: May 8, 2012

(54) METHOD FOR OPTIMIZING ACOUSTIC SOURCE ARRAY PERFORMANCE

(75) Inventors: Jon-Fredrik Hopperstad, Cambridge (GB); Robert Laws, Cambridge (GB); Aslaug Stroemmen Melboe, Bekkestua (NO)

(73) Assignee: WesternGeco L.L.C., Houston, TX (US)

( * ) Notice: Subject to any disclaimer, the term of this patent is extended or adjusted under 35 U.S.C. 154(b) by 612 days.

(21) Appl. No.: 12/337,118

(22) Filed: Dec. 17, 2008

(65) Prior Publication Data

US 2010/0149911 A1    Jun. 17, 2010

(51) Int. Cl.
    G01V 1/38    (2006.01)
(52) U.S. Cl. .......................................... 367/23
(58) Field of Classification Search ............... 367/14, 367/15, 21, 23, 38, 117, 127
    See application file for complete search history.

(56) References Cited

U.S. PATENT DOCUMENTS

| | | | |
|---|---|---|---|
| 4,300,653 A | 11/1981 | Cao et al. | |
| 4,476,550 A | 10/1984 | Ziolkowski et al. | |
| 4,476,553 A | 10/1984 | Ziolkowski et al. | |
| 4,608,673 A | 8/1986 | Lazear | |
| 4,644,507 A * | 2/1987 | Ziolkowski | 367/23 |
| 4,739,858 A | 4/1988 | Dragoset, Jr. | |
| 4,800,538 A * | 1/1989 | Passmore et al. | 367/55 |
| 4,868,794 A | 9/1989 | Ziolkowski et al. | |
| 5,134,590 A | 7/1992 | Garotta | |
| 5,184,329 A | 2/1993 | Regnault et al. | |
| 5,469,404 A | 11/1995 | Barber et al. | |
| 5,677,893 A | 10/1997 | de Hoop et al. | |
| 5,841,733 A * | 11/1998 | Bouyoucos et al. | 367/15 |
| 5,864,307 A | 1/1999 | Henley | |
| 5,933,789 A * | 8/1999 | Byun et al. | 702/17 |
| 6,256,589 B1 | 7/2001 | Gallotti Guimaraes | |
| 6,587,055 B1 * | 7/2003 | Turner et al. | 340/856.3 |
| 6,859,734 B2 | 2/2005 | Bednar | |
| 7,218,572 B2 | 5/2007 | Parkes | |
| 7,415,401 B2 | 8/2008 | Calvert et al. | |
| 7,440,357 B2 | 10/2008 | Hopperstad | |
| 2003/0078734 A1 | 4/2003 | Ozbek | |
| 2004/0013037 A1 * | 1/2004 | Vaage | 367/21 |
| 2004/0109387 A1 * | 6/2004 | Jenner et al. | 367/14 |
| 2004/0228214 A1 * | 11/2004 | Tulett | 367/15 |
| 2005/0027454 A1 * | 2/2005 | Vaage et al. | 702/17 |
| 2005/0128874 A1 * | 6/2005 | Herkenhoff et al. | 367/56 |
| 2005/0195686 A1 * | 9/2005 | Vaage et al. | 367/21 |
| 2005/0259513 A1 * | 11/2005 | Parkes | 367/23 |

(Continued)

FOREIGN PATENT DOCUMENTS

FR    2702281 A    9/1993

OTHER PUBLICATIONS

PCT Search Report, dated Aug. 2, 2010, Application No. PCT/US2009/067756.

(Continued)

*Primary Examiner* — Thomas Tarcza
*Assistant Examiner* — James Hulka

(57) ABSTRACT

A technique facilitates obtaining seismic data in a marine environment. An array of acoustic sources is deployed in a marine environment. The array can be utilized for creating acoustic pulses that facilitate the collection of data on subsea structures. The methodology enables optimization of acoustic source array performance to improve the collection of useful data during a seismic survey.

19 Claims, 6 Drawing Sheets

U.S. PATENT DOCUMENTS

| | | | |
|---|---|---|---|
| 2006/0034151 A1* | 2/2006 | Iranpour | 367/21 |
| 2006/0158962 A1* | 7/2006 | Jeffryes | 367/41 |
| 2006/0193204 A1 | 8/2006 | Davies et al. | |
| 2006/0256651 A1 | 11/2006 | Sanders et al. | |
| 2006/0256658 A1 | 11/2006 | Christie et al. | |
| 2007/0115757 A1* | 5/2007 | Soerli et al. | 367/144 |
| 2007/0153627 A1 | 7/2007 | Tulett et al. | |
| 2007/0159924 A1* | 7/2007 | Vook et al. | 367/127 |
| 2007/0258322 A1 | 11/2007 | Hopperstad | |
| 2007/0263489 A1* | 11/2007 | Vaage | 367/144 |
| 2007/0286019 A1* | 12/2007 | Love et al. | 367/25 |
| 2008/0011540 A1 | 1/2008 | Moldoveanu et al. | |

OTHER PUBLICATIONS

Steinberg, Principles of Aperture and Array System Design, Wiley, 1976, pp. 142-144.

* cited by examiner

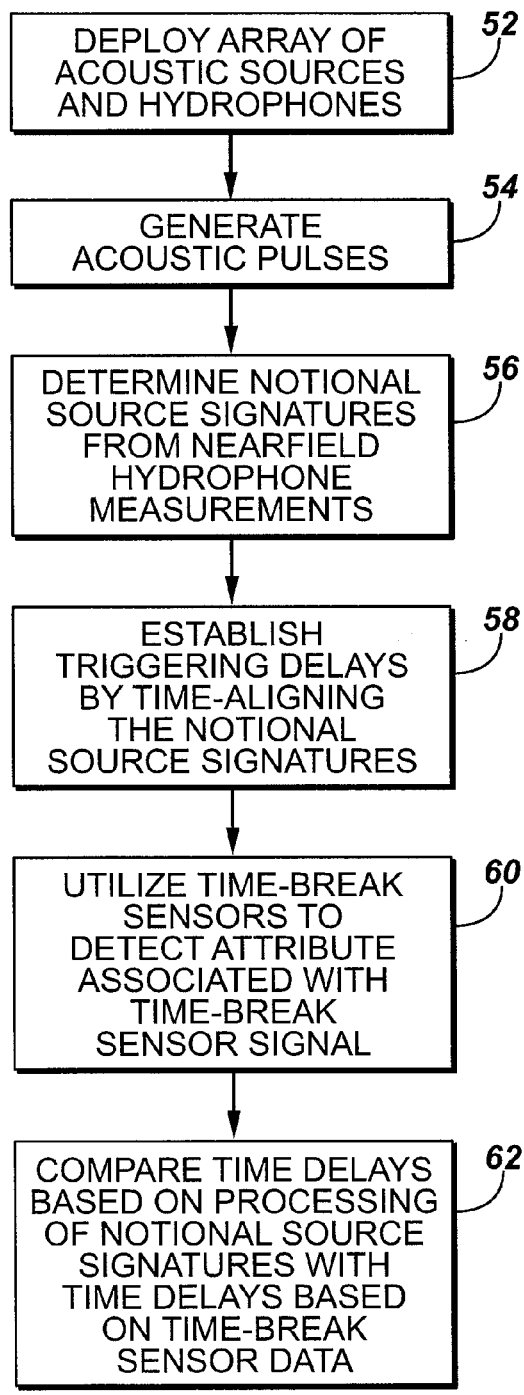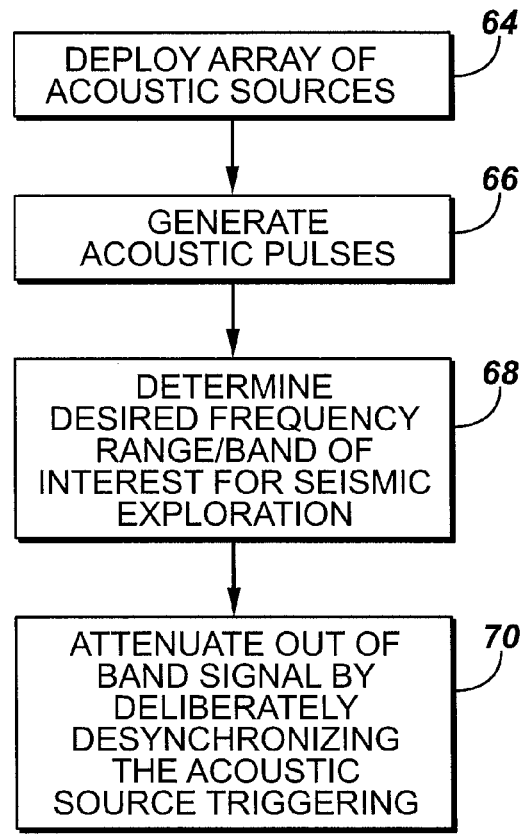

METHOD FOR OPTIMIZING ACOUSTIC SOURCE ARRAY PERFORMANCE

BACKGROUND

In a variety of marine environments, seismic surveys are conducted to gain a better understanding of geological formations beneath a body of water. Marine seismic source arrays are used to generate acoustic pulses in the water, and hydrophones detect the reflected signals. Firing controllers are employed to trigger the firing of the acoustic source elements so the main pressure pulse of each element is synchronized in the farfield in the desired direction. For example, the triggering may be conducted such that the primary pulses of each element coincide in a vertical direction in the farfield. In some applications, the firing controller implements time delays to compensate for individual variations in the mechanical triggering mechanisms of the acoustic source elements. Triggering delays can also be used to compensate for geometric variations of the source array.

One approach to quantifying the mechanical triggering delay is to use a time-break sensor. The time-break sensor is positioned inside or proximate the acoustic source element, e.g. air gun, and a specific attribute is detected in the signal measured by the time-break sensor. For example, the attribute may comprise signal maximum amplitude, time of threshold, zero-crossing, or other suitable attributes. The time delay between sending the firing signal and the time of the detected attribute in the time-break signal is processed via a firing control algorithm to adjust the time of the next firing signal.

However, acoustic source element synchronization using air gun mounted time-break sensors provides only an indirect way of synchronizing the peak pressure of the emitted acoustic signals. The approach assumes a constant, source element independent, time offset between the detected attribute in the time-break signal and the time of peak acoustic pressure. In many applications, this assumption is not valid and the time-break synchronization results in sub-optimal alignment of peak acoustic pressure of the acoustic signals. Sometimes, the problem may be mitigated by using firing controllers that support tuning and measurements from nearfield hydrophones. However, with modern compact array configurations it is not possible to distinguish acoustic signals from adjacent air guns in the unprocessed nearfield hydrophone measurements.

Another problem with conventional air guns is the emission of significant acoustic amplitude outside of the frequency range of interest for seismic exploration. The out of band signal represents noise that can interfere with measurements and/or have an adverse affect on marine life.

SUMMARY

In general, the present invention provides a methodology for obtaining seismic data in a marine environment. An array of acoustic sources is deployed in a marine environment. The array can be employed in creating acoustic pulses which are useful in obtaining data on subsea structures. The methodology enables optimization of acoustic source array performance to facilitate the collection of useful data during a seismic survey.

BRIEF DESCRIPTION OF THE DRAWINGS

Certain embodiments of the invention will hereafter be described with reference to the accompanying drawings, wherein like reference numerals denote like elements, and:

FIG. 9 is a flowchart illustrating one example of an operational procedure for optimizing source array performance, according to an embodiment of the present invention; and FIG. 10 is a flowchart illustrating another example of an operational procedure for optimizing source array performance, according to an embodiment of the present invention.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a technique for use in obtaining seismic data in a marine environment. The technique aids in the optimization of acoustic source array performance with respect to acoustic source arrays employed in conducting seismic surveys. In one application, for example, the technique facilitates the attenuation of high frequency output from acoustic sources by desynchronizing the source triggering. In an alternate aspect of the technique, the acoustic sources may be synchronized using band-limited notional source signatures.

Figure 1:
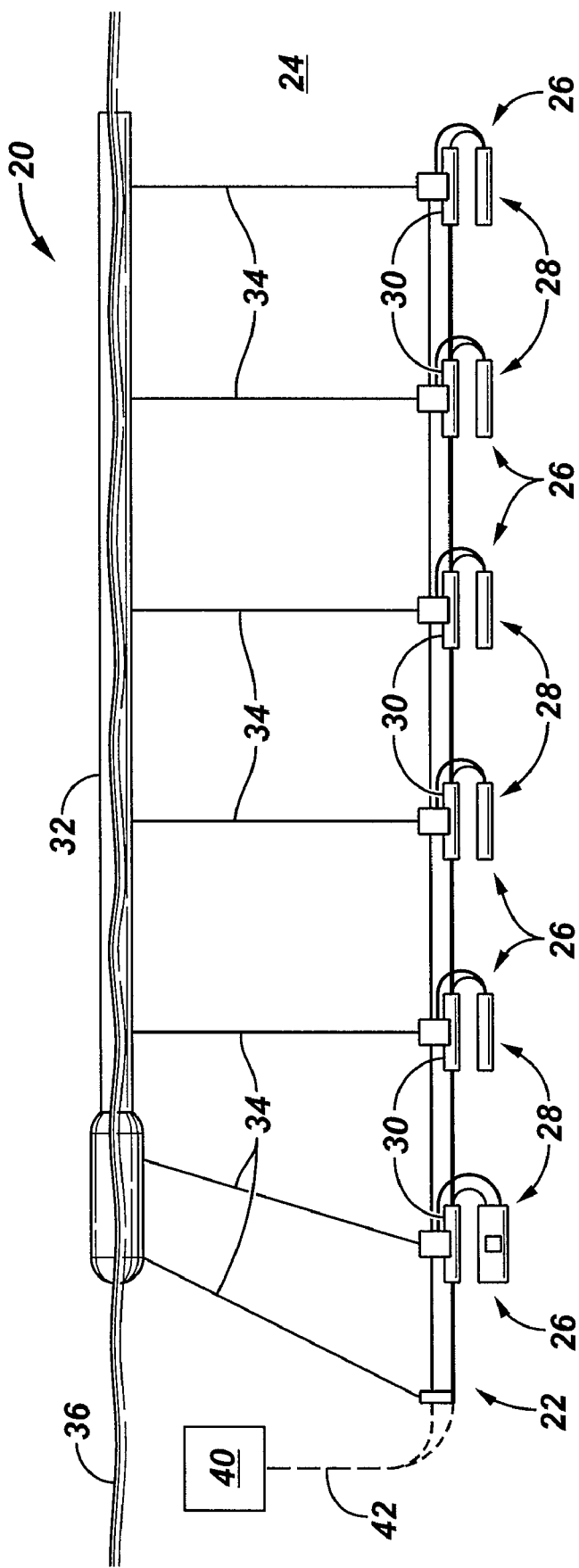
FIG. 1 is a schematic view of an acoustic source array in a marine survey area, according to an embodiment of the present invention.

Referring generally to FIG. 1, an example of a seismic survey system 20 is illustrated according to one embodiment of the present invention. As illustrated, system 20 comprises an acoustic source subarray 22 that is towed through a marine seismic survey area 24 to conduct a marine seismic survey. The acoustic source subarray 22 may be towed by a suitable surface vessel connected to acoustic source subarray 22 via a tow line.

In the example illustrated, seismic survey system 20 further comprises a plurality of pairs 26 of acoustic sources 28 and hydrophones 30. However, the seismic survey system 20 may be constructed in a variety of configurations that may comprise pairs 26 or other arrangements of hydrophones 30 and acoustic sources 28. Generally, the hydrophones 30 and acoustic sources 28 are selected such that there are at least as many hydrophone measurements as there are unknown notional sources. This enables computation of the notional source signatures. In the specific example illustrated, the acoustic sources 28 may each comprise an air gun (or air gun cluster) designed to emit pressure pulses at controlled points in time. The hydrophones 30 may be nearfield hydrophones that are each positioned above a corresponding acoustic source or at other suitable locations. The acoustic sources 28 and hydrophones 30 may be arranged in pairs 26 or other configurations that are, for example, suspended from a float 32 via appropriate suspension lines 34. Float 32 is designed to float along a surface 36 of the water in the marine seismic survey area 24.

A control system 40, such as a computer-based control system, may be used to process data from hydrophones 30 and/or to convey control signals to the acoustic sources 28. The control signals can be used to control the triggering of acoustic sources 28 to provide acoustic pulses used in conducting a seismic survey. Data flow between control system 40 and pairs 26 can be conducted over suitable communication lines 42. By way of example, control system 40 can be positioned on a suitable towing vessel or at other locations, such as directly on the acoustic source subarray 22.

Figure 2:
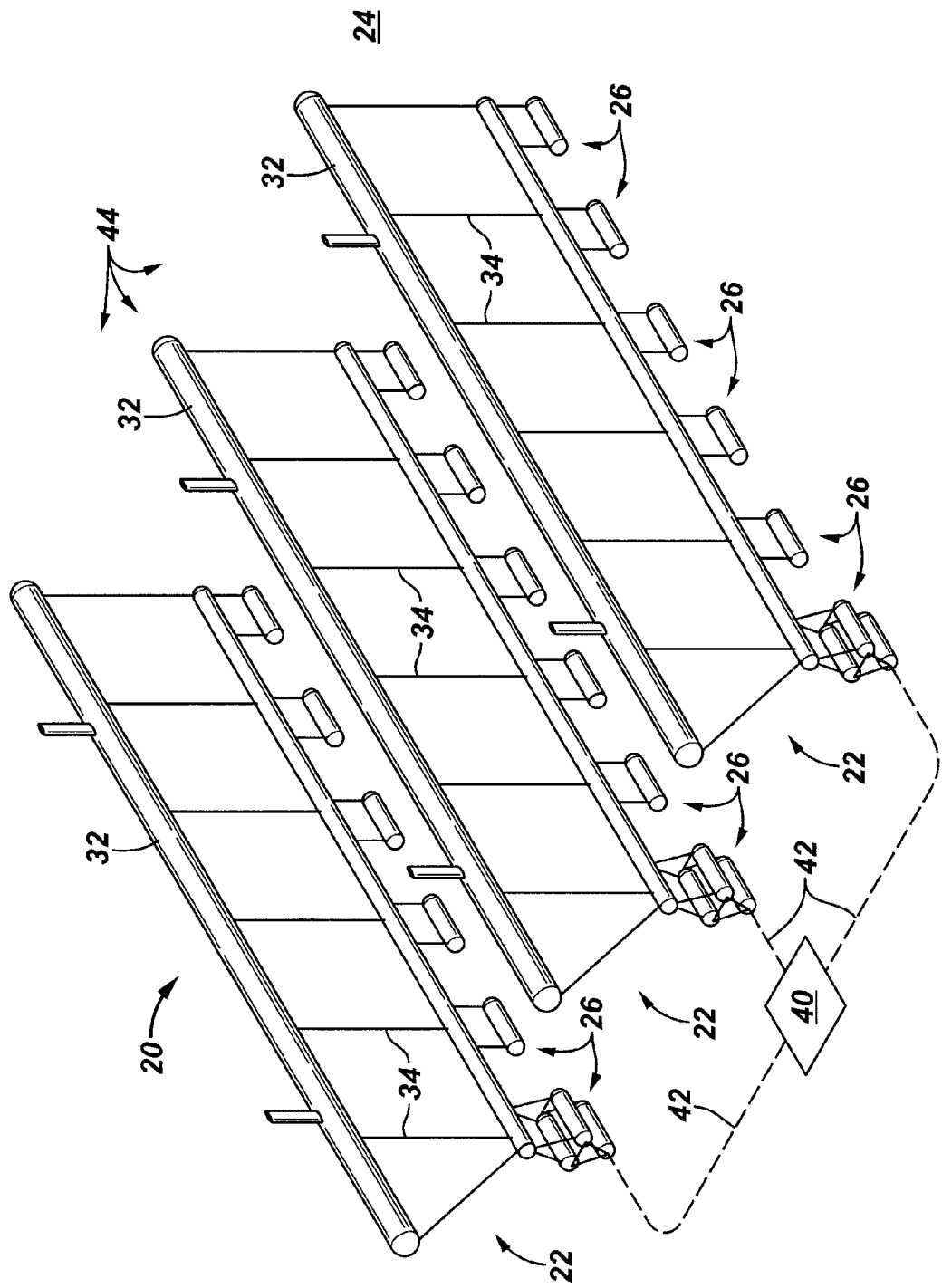
FIG. 2 is a schematic view of another example of an acoustic source array, according to an embodiment of the present invention.

The acoustic sources 28 and hydrophones 30 may be arranged in a variety of array configurations. In the embodiment illustrated in FIG. 2, for example, seismic survey system 20 comprises a seismic array 44 having a plurality of acoustic source subarrays 22. Each acoustic source subarray 22 comprises a plurality of pairs 26 of acoustic sources 28 and nearfield hydrophones 30. By way of specific example, seismic array 44 may comprise three subarrays 22 with each subarray comprising six pairs 26. However, other configurations can be used to conduct seismic surveys.

The reflected acoustic signals detected by hydrophones 30 and the data processed by control system 40 are improved by optimizing acoustic source array performance, e.g. synchronization. According to one embodiment, the acoustic signals are time-aligned directly. By way of example, acoustic source synchronization can be achieved using band-limited notional source signatures. The general notional source theory is described in various publications, such as U.S. Pat. No.: 4,476,553 (Ziolkowski et al.).

Figure 3:
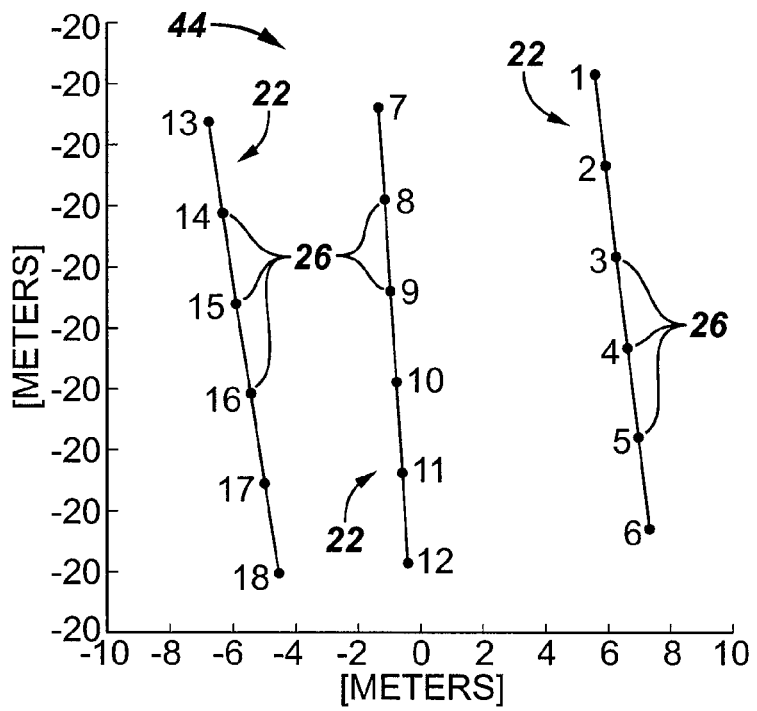
FIG. 3 is a diagram showing locations of acoustic source/hydrophone pairs in one example of an acoustic source array, according to an embodiment of the present invention.
Figure 4:
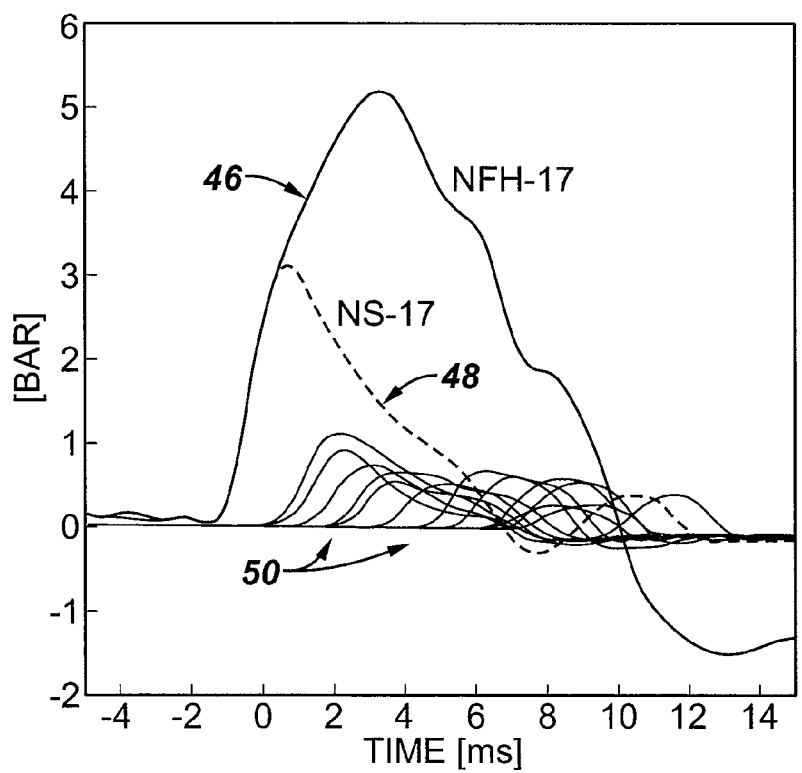
FIG. 4 is a diagram illustrating data from a signal detected at one of the hydrophones based on contributions from the acoustic source elements in an array such as the array illustrated in FIG. 3, according to an embodiment of the present invention.

In FIG. 3, one example of seismic source array 44 is illustrated schematically in a plan view showing 18 unique pairs 26. Each individual hydrophone 30 of a given pair 26 measures the overall acoustic signal which has contributions from the corresponding acoustic source 28 as well as the other acoustic sources 28 in array 44. In the graph illustrated in FIG. 4, for example, a pressure signal recorded by an individual nearfield hydrophone 30 is illustrated by a solid line 46. In this sample, the pressure signal 46 is detected by the hydrophone 30 located at position 17 of FIG. 3. The recorded pressure signal 46 results from contributions of the acoustic sources and comprises a signal 48 from the closest acoustic source 28, e.g. the corresponding acoustic source 28 in the subject pair 26. The recorded pressure signal 46 also comprises contributing signals 50 from the other acoustic sources 28 in acoustic source array 44.

Even though the primary pressure pulses of individual acoustic sources cannot be distinguished by individual hydrophones, implementation of the notional source method enables calculation of the acoustic signals from the individual acoustic sources 28. The individual contributions are the notional source signatures. Accordingly, control system 40 may comprise a processing system, e.g. a computer-based system, used to calculate the acoustic signals from individual acoustic sources based on the notional source method. The control system 40 is further used to process the data and to determine triggering delays with respect to acoustic sources 28 by time-aligning the notional source signatures. It should be noted that in many applications, the notional source signatures can be range or band limited to a frequency range of interest. As a result, the acoustic sources can be synchronized directly rather than relying solely on indirect synchronization from acoustic source mounted time-break sensors.

However, another embodiment of the methodology utilizes a synchronization method that combines the use of notional source signature attributes and attributes associated with time-break sensor signals. In this embodiment, pairs 26 can incorporate time-break sensors mounted to, for example, acoustic sources 28. As described above, the time-break sensors are used to detect an attribute associated with a time-break sensor signal. The attribute is used to estimate a time delay with respect to triggering individual acoustic sources to optimize the collection of data during a seismic survey. In this embodiment, control system 40 is used to compare processed time delays based on detection of the attribute through time-break sensors with the direct synchronization time delays. The direct synchronization time delays are obtained through the calculation of notional source signatures and the determination of triggering delays by time-aligning the notional source signatures. The comparison can provide validation or checks regarding the actual triggering delays implemented.

In one example, the synchronization of an air gun array is optimized by computing an additional synchronization delay that relates a time-break sensor to an emitted notional source signature, where the notional source signature is band limited to the frequency range of interest. By way of example, the data can be band limited to approximately 0-128 Hz, however other desired seismic bands or ranges can be employed. The synchronization of notional source signatures also can be employed in other applications. For example, the approach can be used in applications that utilize an emitted acoustic signal at frequencies outside the seismic band. The approach also can be used in applications that do not necessarily aim to synchronize the primary pressure pulse emitted by the acoustic source elements of the acoustic array.

According to another embodiment of the methodology, the array synchronization may be optimized by desynchronizing the triggering of the acoustic sources 28. This allows the power spectrum of the seismic array 44 to be attenuated at out of band frequencies, i.e. the frequencies outside of a desired seismic frequency range/band. Additionally, the output within the desired seismic frequency band is substantially unaffected.

Attenuation of the out of band signal is accomplished by deliberately desynchronizing the acoustic source triggering as controlled by control system 40. When acoustic sources 28 are used to provide primary pressure pulses, the desired emission direction of the superpositioned wavefield can be described by:

$$W(\omega) = \sum_{n=1}^{N} S_n(\omega) \cdot \exp(-j\omega\tau_{n,geo}) \cdot \exp(-j\omega\tau_{n,sync})$$

Where $S_n(\omega)$ are the notional source signatures of the N source elements, $\omega$ is the angular frequency, $\tau_{n,geo}$ are the synchronization delays that compensate for the position of the source elements relative to the desired farfield emission direction, and $\tau_{n,sync}$ are the time delays that result from imperfect synchronisation due to the random nature of the mechanical triggering together with sub-optimal performance of the synchronisation control algorithm. It should be noted $\tau_{n,sync}=0$ for the idealised case of perfect synchronisation. Furthermore, $\tau_{n,sync}$ generally have a non-zero mean when the seismic array 44 is synchronised using time-break sensors, while a seismic array synchronised using the notional source signatures has $\tau_{n,sync}$ values with zero mean.

In the presently described embodiment, an additional time delay, $\tau_{n,scatter}$, is introduced to deliberately desynchronise the alignment of the primary pressure pulses, such that:

$$W(\omega) = \sum_{n=1}^{N} S_n(\omega) \cdot \exp(-j\omega\tau_{n,geo}) \cdot \exp(-j\omega\tau_{n,sync}) \cdot \exp(-j\omega\tau_{n,scatter})$$

The additional time delays, $\tau_{n,scatter}$, are chosen so the out of (seismic) band amplitude is attenuated, while the amplitude within the desired seismic band/range is substantially unaffected. Guidelines for the choice of $\tau_{n,scatter}$ values can be found by analysing the power spectrum of the normalised scattering function:

$$W_{scatter}(\omega) = \frac{1}{N}\sum_{n=1}^{N} \exp(-j\omega\tau_{n,scatter}).$$

Figure 5:
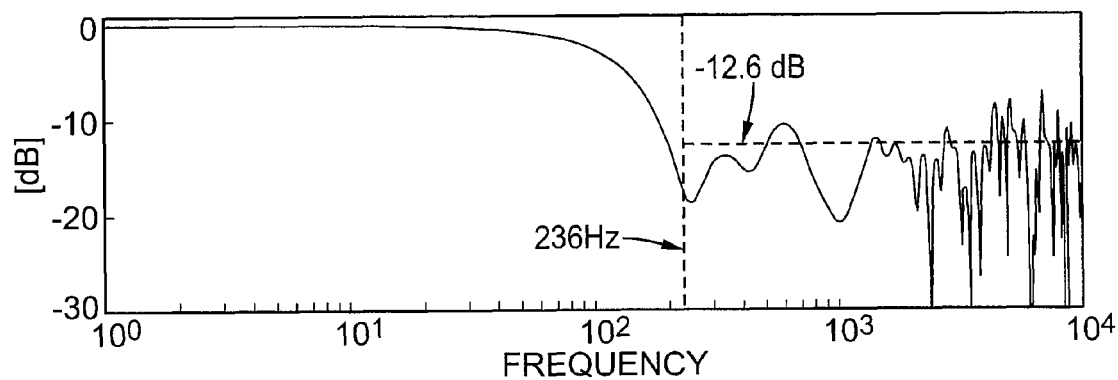
FIG. 5 is a diagram illustrating a power spectrum of a scattering function, according to an embodiment of the present invention.

Referring generally to FIG. 5, the power spectrum of this function is illustrated for the example when the time delays of the N=18 elements are randomly drawn from a uniform distribution within [−L/2, +L/2] where L is the length of the window to which the scattering delays are confined. In many applications, L is greater than 1 millisecond. In the example of FIG. 5, N=18, L=4 milliseconds, and the average out of band attenuation is −12.6 dB for frequencies above about 236 Hz. When the scatter-delays are chosen from a random uniform distribution, the average attenuation of the out of band frequencies has been shown as: $10 \cdot \log_{10}(1/N)$. In this example, the attenuation is only −1.1 dB at 100 Hz for the L=4 millisecond case. Furthermore, the lower end of the stopband is approximately:

$$f = \frac{N-1}{N \cdot L},$$

where f is the linear frequency.

Figure 6:
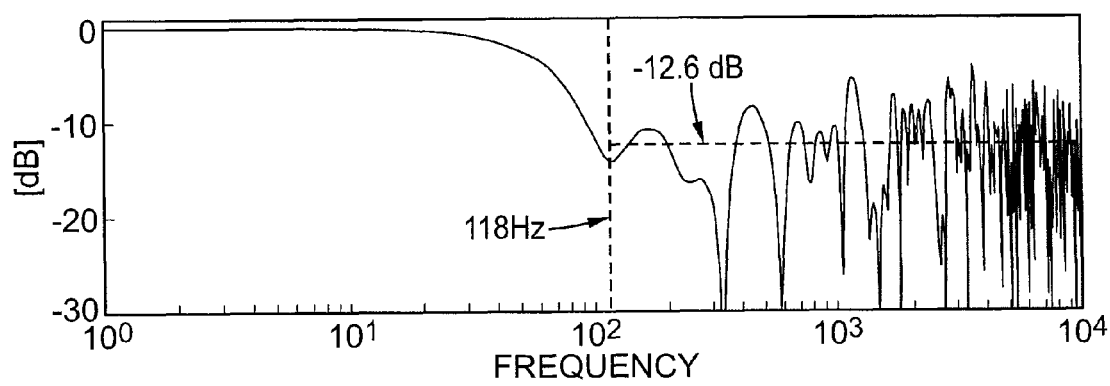
FIG. 6 is a diagram illustrating another power spectrum of a scattering function, according to an alternate embodiment of the present invention.
Figure 7:
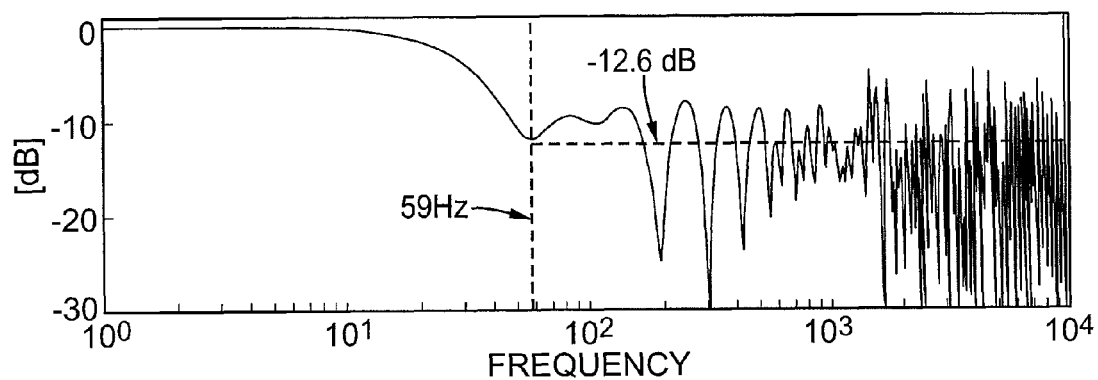
FIG. 7 is a diagram illustrating another power spectrum of a scattering function, according to an alternate embodiment of the present invention.

Additional examples of the power spectrum are illustrated graphically in FIGS. 6 and 7 for the cases when N=18; and L=8 milliseconds and 16 milliseconds, respectively. In the examples of FIGS. 6 and 7, the average out of band attenuation is −12.6 dB for frequencies above about 118 Hz and 59 Hz respectively.

Accordingly, the out of band amplitude of the signal can be attenuated by deliberately scattering the acoustic source synchronization such that the time delays $\tau_{n,scatter}$ in the equation:

$$W(\omega) = \sum_{n=1}^{N} S_n(\omega) \cdot \exp(-j\omega\tau_{n,geo}) \cdot \exp(-j\omega\tau_{n,sync}) \cdot \exp(-j\omega\tau_{n,scatter})$$

have non-zero values. In many applications, these scattering delays are confined to a window of length, L, of greater than 1 millisecond and the scattering delays, $\tau_{n,scatter}$, are chosen such that the combined delay of the synchronization error, $\tau_{n,sync}$, and the scattering delays conform to a chosen statistical distribution. In the examples in FIG. 5-FIG. 8, the combined delay is randomly drawn from a uniform distribution.

Figure 8:
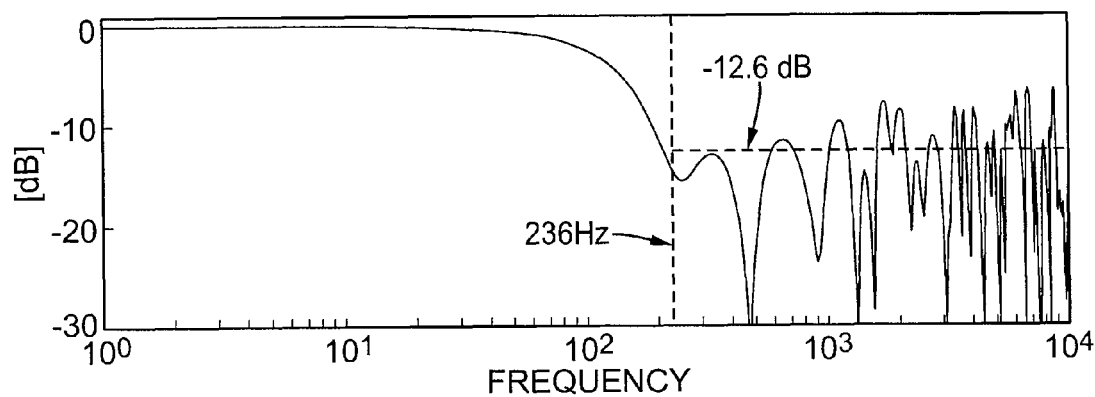
FIG. 8 is a diagram illustrating a power spectrum arising from deliberate scattering of the firing times within a given window of time, according to an embodiment of the present invention.

In some embodiments, the deliberate desynchronization is achieved by scattering the triggering times of the acoustic sources 28, however the deliberate desynchronization also can be achieved by scattering the position of the acoustic source elements. In the latter example, the acoustic sources are scattered such that the resulting perturbation to the propagation time in the desired emission direction equals the prescribed scattering time delays. One example of the power spectrum arising from the deliberate desynchronization through scattering of firing/triggering times of the acoustic sources is illustrated in FIG. 8. In this example, the deliberate scattering is again within a 4 millisecond window and the average out of band attenuation is −12.6 dB for frequencies above about 236 Hz. However, other power spectrums, such as the generic power spectrums described above, may be used in other applications.

The systems and methodology for optimizing acoustic source performance/synchronization can vary from one seismic survey application to another. However, one operational example is illustrated by the flowchart of FIG. 9. In this example, an array of acoustic sources and hydrophones is initially deployed in a marine seismic survey area to enable performance of a seismic survey, as represented by block 52. The acoustic sources are used to generate acoustic pulses, as illustrated by block 54. By way of example, the acoustic sources may comprise air guns arranged individually or in clusters at specific array locations.

The notional source signatures are determined via, for example, control system 40 based on data from nearfield hydrophone measurements, as represented by block 56. The notional source signatures are used to establish triggering delays by time-aligning the notional source signatures, as indicated by block 58. By establishing appropriate triggering delays, the collection of seismic data during the survey is effectively optimized. In some applications, optional time-break sensors also are utilized to detect an attribute associated with the time-break sensor signal, as represented by block 60. Detection of the attribute by the time-break sensors enables determination of related time delays that can be compared to the time delays that result from processing the notional source signatures, as represented by block 62. The processing of data and the comparison of time delays can be conducted on computer-based control system 40.

In another operational example, acoustic sources 28 are initially deployed, as indicated by block 64 of the flowchart illustrated in FIG. 10. Once the array is deployed, the acoustic sources are used to generate acoustic pulses, as indicated by block 66. A desired frequency range or band of interest for seismic exploration also is determined, as represented by block 68. The desired frequency band is used to enable attenuation of out of band signals by deliberately desynchronizing the acoustic source triggering, as indicated by block 70. The computer-based control system 40 can be used to establish the parameters for desynchronizing the acoustic source triggering and to initiate the deliberate scattering of source triggering.

The examples discussed above are just a few of the configurations and procedures that can be used to control acoustic source synchronization in a manner that optimizes data collection during a seismic survey. For example, the number and arrangement of acoustic sources as well as the number and arrangement of hydrophones can vary from one application to another. Similarly, the type of control system and the location of the control system can be adapted to specific equipment and/or applications. Furthermore, the determination and use of notional source signatures can be established according to various paradigms depending on, for example, system factors, environmental factors, sensor types, and other factors. Additionally, the desired frequency ranges/bands can vary between seismic exploration applications. Techniques for generating acoustic inputs also may change depending on the environment and available equipment.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method, comprising:
    deploying an array of acoustic sources in a marine environment;
    creating acoustic pulses with the acoustic sources to obtain data on subsea structures; and
    deliberately scattering acoustic source synchronization by desynchronizing triggering of the acoustic sources in a manner such that the power spectrum of the array is attenuated at frequencies outside of a desired seismic frequency band without substantially affecting output within the desired frequency band.

2. The method as s recited in claim 1, wherein deliberately scattering comprises scattering triggering times of the acoustic sources.

3. The method as recited in claim 1, wherein deliberately scattering comprises scattering the position of the acoustic sources.

4. The method as recited in claim 1, further comprising using a plurality of hydrophones to detect the acoustic pulses.

5. The method as recited in claim 1, wherein deliberately scattering comprises selecting time delays such that signal amplitudes outside a predetermined seismic band are attenuated while signal amplitudes within the predetermined band are substantially unaffected.

6. The method as recited in claim 5, wherein selecting time delays comprises confining the time delays to a window length that is greater than 1 millisecond.

7. The method as recited in claim 5, wherein selecting comprises selecting time delays that are randomly drawn from a chosen distribution.

8. A method, comprising:
    deploying an array of acoustic sources and hydrophones in a marine environment;
    creating acoustic pulses with the acoustic sources;
    synchronizing the acoustic sources by processing notional source signatures from nearfield hydrophone measurements;
    determining triggering delays for the acoustic sources by time-aligning the notional source signatures;
    utilizing time-break sensors to detect an attribute associated with a time-break sensor signal;
    comparing processed time delays based on detection of the attribute with direct synchronization time delays obtained through the calculation of notional source signatures and the determination of triggering delays by time-aligning the notional source signatures; and
    using the comparing to validate the actual triggering delays implemented.

9. The method as recited in claim 8, further comprising limiting the notional source signatures to a frequency range of interest.

10. A method, comprising:
    operating an array of acoustic sources in a marine environment to obtain seismic data;
    using the array of acoustic sources to deliver primary pressure pulses into the marine environment; and
    deliberately desynchronizing alignment of the primary pressure pulses such that the power spectrum of the array is attenuated at frequencies outside of a desired seismic frequency band without substantially affecting output within the desired frequency band.

11. The method as recited in claim 10, wherein deliberately desynchronizing comprises introducing time delays with respect to the primary pressure pulses.

12. The method as recited in claim 11, wherein introducing comprises introducing time delays that are substantially uniformly distributed.

13. The method as recited in claim 10, wherein deliberately desynchronizing comprises scattering triggering times of the acoustic sources.

14. The method as recited in claim 10, wherein deliberately desynchronizing comprises scattering the position of the acoustic sources.

15. A method for use in obtaining seismic data in a marine environment, comprising:
    determining notional source signatures from nearfield hydrophone measurements in a marine environment;
    establishing triggering delays of acoustic source elements by time-aligning the notional source signatures;
    performing a comparison of process time delays with direct synchronization time delays;
    using the comparison to validate actual triggering delays; and
    triggering the acoustic source elements according to the triggering delays.

16. The method as recited in claim 15, wherein triggering comprises triggering air guns arranged in a desired array.

17. The method as recited in claim 15, further comprising limiting the notional source signatures to a frequency range of interest.

18. The method as recited in claim 15, further comprising utilizing time-break sensors to detect an attribute associated with a time-break sensor signal.

19. The method as recited in claim 18, further comprising comparing time delays based on detection of the attribute and on processing the notional source signatures.

* * * * *